F. H. WEAVER.
CULTIVATING IMPLEMENT.
APPLICATION FILED AUG. 10, 1908.
900,004.
Patented Sept. 29, 1908.
2 SHEETS—SHEET 1.
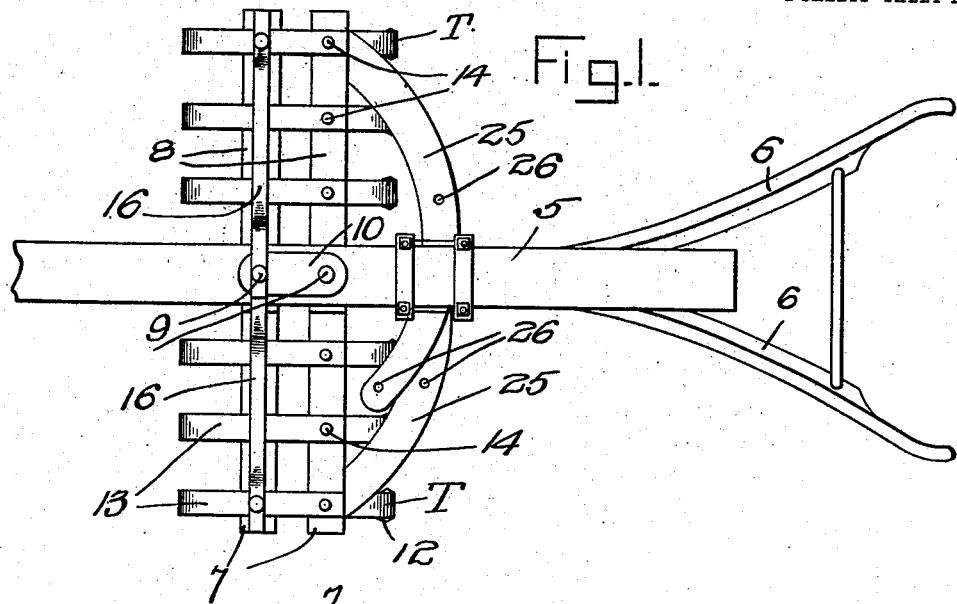
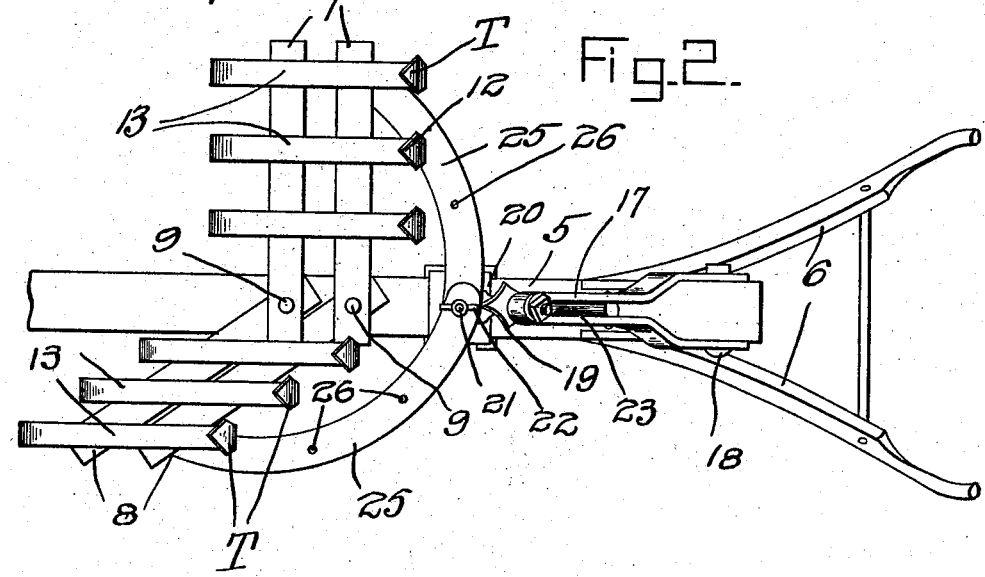
Witnesses
J. H. Miller
M. De Grange
Inventor
F. H. Weaver,
By D. Swift & Co.
Attorneys F. H. WEAVER.
CULTIVATING IMPLEMENT.
APPLICATION FILED AUG. 10, 1908.
900,004.
Patented Sept. 29, 1908.
2 SHEETS—SHEET 2.
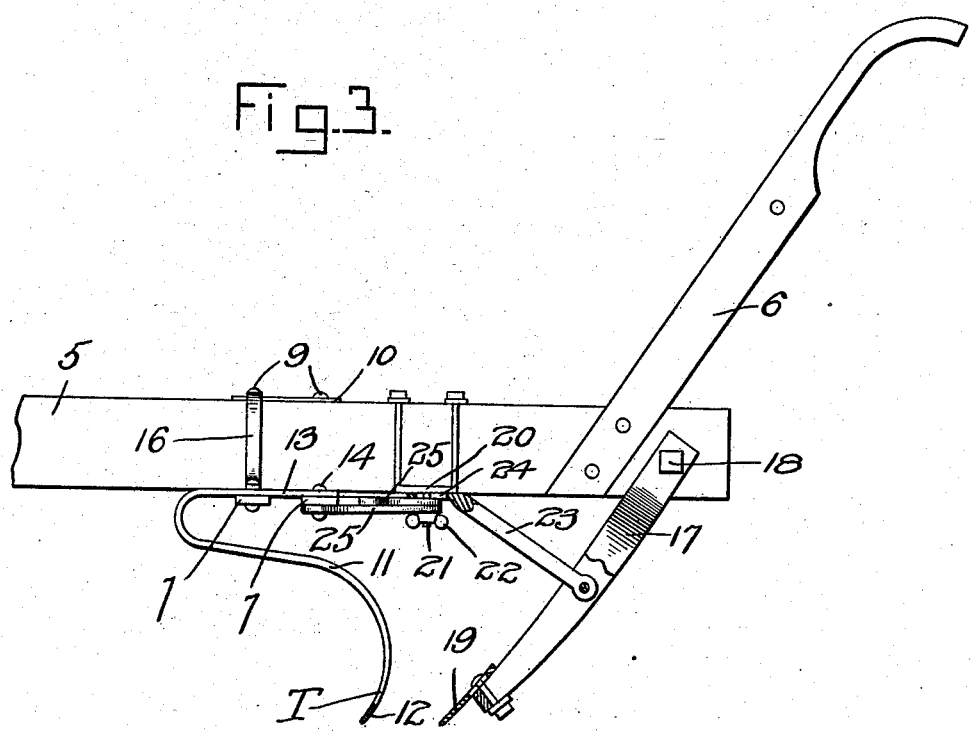
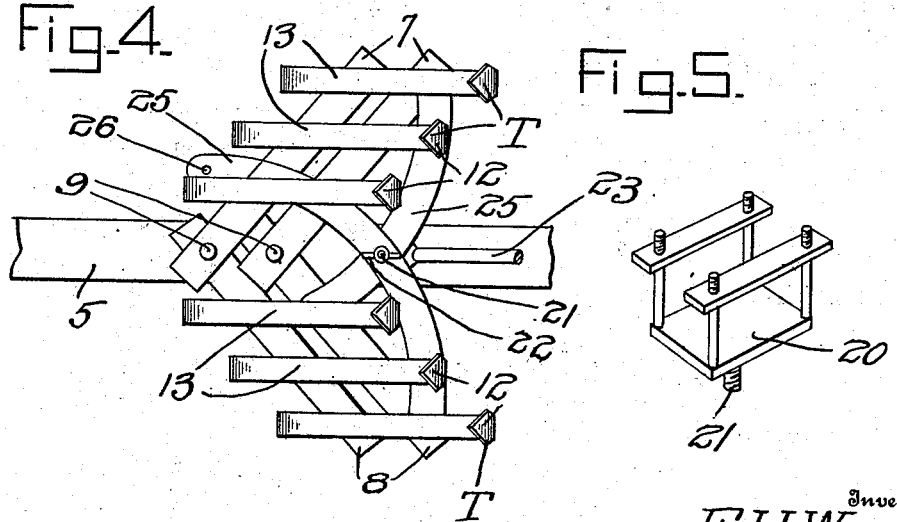
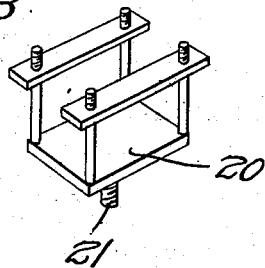

UNITED STATES PATENT OFFICE.

FLEMING H. WEAVER, OF GRIFFIN, GEORGIA.

CULTIVATING IMPLEMENT.

No. 900,004.      Specification of Letters Patent.      Patented Sept. 29, 1908.

Application filed August 10, 1908. Serial No. 447,790.

*To all whom it may concern:*

Be it known that I, FLEMING H. WEAVER, a citizen of the United States, residing at Griffin, in the county of Spalding and State of Georgia, have invented a new and useful Cultivating Implement; and I do hereby declare the following to be a full, clear, and exact description of the invention, such as will enable others skilled in the art to which it appertains to make and use the same.

This invention relates to implements for cultivating the soil, and it has particular reference to that class of cultivators in which the cultivator teeth are pivotally connected with and carried by pairs of bars disposed in parallel relation, said pairs of bars being pivotally connected with a beam or draft-bar, under which construction the parallel bars are capable of adjustment to different positions, thus effecting a corresponding adjustment of the cultivator teeth, which latter may be arranged in V-shape with the apex of the V point in a forward or rearward direction, as may be desired; the said teeth may be disposed in a straight row at approximately right angles to the beam; or they may be disposed in a diagonal row with relation to the beam. Again, by proper adjustment of the parallel bars, the cultivator teeth may be spaced various distances apart so as to make furrows more or less closely together, as may be desired.

The present invention has for its object to simplify and improve the construction and operation of this class of cultivators; and with these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited; but that changes, alterations and modifications within the scope of the invention may be resorted to when desired.

In the drawings—Figure 1 is a top plan view of a cultivator constructed in accordance with the invention. Fig. 2 is a bottom plan view showing a different arrangement of the teeth. Fig. 3 is a side elevation partly in section. Fig. 4 is a perspective detail view of the clamp constituting the adjusting and fastening member. Fig. 5 is a sectional detail view of said clamp.

Corresponding parts in the several figures are denoted by like characters of reference.

The beam 5, which is in the nature of an ordinary plow beam, is provided with handles 6, by means of which it may be manipulated. Upon the under side of the beam there are pivoted two pairs of bars 7, 7, and 8, 8, extending in opposite directions from the beam. The pins or bolts 9 with which these bars are pivoted, extend vertically through the beam, which latter is provided upon its upper side with a wear-plate 10.

The cultivator teeth T are constructed, each of a single strap of steel or other metal, bent to form a shank 11, provided at its lower end with an earth engaging point 12, and having at its upper end a return bend 13 connecting the upper sides of two of the bars 7, 7, and 8, 8, with which the return bends of the teeth are connected pivotally by means of pins or rivets 14. Thus it will be seen that each pair of parallel bars carries a set of teeth, one such set of teeth being disposed at each side of the beam 5. It will also be seen that by moving the parallel bars upon the pins or bolts 9, whereby they are pivotally connected with the beam, the outer or free ends of said parallel bars may be moved in a forwardly or rearwardly direction, as may be desired; the sets of teeth may thus be adjusted in V-shaped relation with the apex of the V-point in a forward or in a rearward direction, as may be desired; or the parallel bars may be disposed in longitudinal alinement upon opposite sides of the beam, either at right-angles to the latter or at various deviations from a right angle. The cultivator may thus be used for right and left hand work, as may be desired, or for hilling or ridging the ground, the dirt being thrown towards the center or in an outward direction, as may be desired. Thus the improved cultivator may be used for a great variety of purposes by a very simple and easily accomplished adjustment of the teeth. Moreover, it will be seen that by proper adjustment of the parallel bars the distance between the individual teeth may be varied, said teeth being placed more or less closely together so as to make the furrows at any desired distance apart. Under the construction described, the teeth constitute spring teeth which will do very efficient work; the teeth, it will be observed, are connected with the parallel bars by the return bends only, and the shanks of the teeth will not be weakened by forming bolt holes or apertures therein, nor will the efficiency of the spring shanks be decreased by the presence of such holes or apertures. The outer extremities of the front bars 7 and 8, are connected with one of the bolts 9, by means of braces 16, which serve to increase the strength and stability of the device.

Upon the beam 5, adjacent to the rear end of the latter, there is pivotally mounted a standard 17, which may be appropriately constructed of a single strap of metal bent to form the elongated U-shaped standard which is pivoted upon the beam by single transverse bolt 18. This standard carries a bull-tongue 19, of ordinary construction, which constitutes a central tooth of the improved implement, which it is frequently desired to use for the purpose of avoiding an excessive gap between the two middle teeth T of the device.

Suitably secured upon the beam 5, is a clip-plate 20, having downwardly extending pin 21, which is screw-threaded as shown and provided with a wing-nut 22. A brace 23 which is pivotally connected with the standard 17 is provided near its free end with a slot 24, adapted to engage the pin 21. Pivotally connected with the outer extremity of the rear of the parallel bars 7 and 8, are arcuate brace-bars 25, each provided with a series of apertures 26, adapted for engagement with the pin 21. By means of these arcuate brace-bars the pairs of parallel bars carrying sets of cultivator teeth may be retained in position at various adjustments, the brace bars 23 supporting the standard 17, being likewise retained, and the several braces being firmly secured by means of the single wing-nut 22. By this simple construction it will be seen that any desired adjustment may be effected quickly and in a very thorough and efficient manner. It will furthermore be seen that when desired the brace 23 may be detached from the pin 21, thus permitting the standard 17 carrying the bull-tongue 19 to be swung to an inoperative position in the rear of the beam where it may be supported in any suitable and efficient manner.

From the foregoing description taken in connection with the drawing hereto annexed, the operation and advantages of this invention will be readily understood by those skilled in the art to which it appertains. The construction is simple and inexpensive, and it will be found thoroughly efficient for the purposes for which it is provided.

Having thus described the invention, what is claimed is:

In a cultivating implement, a beam, oppositely extending pairs of parallel bars pivoted upon the underside of the beam, cultivator teeth having return bends pivoted upon the pairs of parallel bars, arcuate braces pivoted upon the under sides of the rear parallel bars adjacent to the outer extremities of said bars, said braces being provided with apertures formed at intervals therein, a clip plate secured upon the beam and having a downward extending screw-threaded pin adapted to be engaged by the arcuate brace bars, and a wing nut upon the screw-threaded pin.

In testimony whereof I have signed my name to this specification in the presence of two subscribing witnesses.

FLEMING H. WEAVER.

Witnesses:
ROBT. T. DANIEL,
WM. E. H. SEARCY, Jr.